United States Patent
Su et al.

(10) Patent No.: US 11,048,124 B2
(45) Date of Patent: Jun. 29, 2021

(54) LIQUID CRYSTAL PANEL AND MANUFACTURING METHOD THEREOF

(71) Applicant: Au Optronics Corporation, Hsinchu (TW)

(72) Inventors: Hsien-Hung Su, Hsinchu (TW);
Seok-Lyul Lee, Hsinchu (TW);
Yen-Huang Hsu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/747,487

(22) Filed: Jan. 20, 2020

(65) Prior Publication Data

US 2021/0072573 A1 Mar. 11, 2021

(30) Foreign Application Priority Data

Sep. 6, 2019 (TW) .................................. 108132228

(51) Int. Cl.
*G02F 1/1337* (2006.01)
*G02F 1/1335* (2006.01)
*G02F 1/1341* (2006.01)

(52) U.S. Cl.
CPC .......... *G02F 1/1337* (2013.01); *G02F 1/1341* (2013.01); *G02F 1/133514* (2013.01)

(58) Field of Classification Search
CPC . G02F 1/1337; G02F 1/133514; G02F 1/1341
See application file for complete search history.

(56) References Cited

U.S. PATENT DOCUMENTS

| | | | |
|---|---|---|---|
| 7,005,468 B2 | 2/2006 | Zang et al. | |
| 7,144,942 B2 | 12/2006 | Zang et al. | |
| 9,429,796 B2 * | 8/2016 | Lee | G02F 1/1341 |
| 9,568,796 B2 | 2/2017 | Cho et al. | |
| 2002/0188053 A1 | 12/2002 | Zang et al. | |
| 2003/0004254 A1 | 1/2003 | Zang et al. | |
| 2003/0035885 A1 | 2/2003 | Zang et al. | |
| 2014/0139795 A1* | 5/2014 | Ryu | G02F 1/133345 349/139 |
| 2014/0146278 A1 | 5/2014 | Lee et al. | |
| 2014/0184970 A1* | 7/2014 | Bae | G02F 1/133753 349/43 |

(Continued)

FOREIGN PATENT DOCUMENTS

| | | |
|---|---|---|
| TW | M310351 | 4/2007 |
| TW | I301211 | 9/2008 |

*Primary Examiner* — Hoan C Nguyen
(74) *Attorney, Agent, or Firm* — JCIPRNET

(57) ABSTRACT

A liquid crystal panel and a manufacturing method thereof are provided. The liquid crystal panel includes a substrate, an electrode layer, an insulating layer, a first alignment layer, a second alignment layer, and a liquid crystal layer. The electrode layer is located on the substrate. The insulating layer is located on the electrode layer. The insulating layer has a cavity and an opening connected to a top portion of the cavity. The electrode layer is located below the cavity. The first alignment layer is located in the cavity and located on the electrode layer. The second alignment layer is located at the top portion of the cavity. Each of the liquid crystal layers is located in the cavity and between the first alignment layer and the second alignment layer.

7 Claims, 14 Drawing Sheets

(56) References Cited

U.S. PATENT DOCUMENTS

| | | | | |
|---|---|---|---|---|
| 2014/0347611 A1* | 11/2014 | Kim | ................ | G02F 1/133377 |
| | | | | 349/106 |
| 2014/0362329 A1* | 12/2014 | Lee | ................ | G02F 1/1341 |
| | | | | 349/86 |
| 2015/0036087 A1* | 2/2015 | Won | ................ | G02F 1/1362 |
| | | | | 349/106 |
| 2015/0070631 A1* | 3/2015 | Prushinskiy | ................ | G02F 1/1339 |
| | | | | 349/89 |
| 2015/0131042 A1* | 5/2015 | Yun | ................ | G02F 1/133377 |
| | | | | 349/110 |
| 2015/0236041 A1* | 8/2015 | Kim | ................ | H01L 27/1288 |
| | | | | 257/72 |
| 2015/0355500 A1* | 12/2015 | Kwon | ................ | G02F 1/133514 |
| | | | | 349/43 |
| 2016/0085099 A1* | 3/2016 | Sugitani | ................ | G02F 1/1337 |
| | | | | 349/43 |
| 2016/0195743 A1* | 7/2016 | Kim | ................ | G02F 1/1341 |
| | | | | 349/43 |
| 2017/0090243 A1* | 3/2017 | Song | ................ | G02F 1/1341 |
| 2017/0235169 A1* | 8/2017 | Lim | ................ | G02F 1/133345 |
| | | | | 349/43 |
| 2017/0299917 A1* | 10/2017 | Jang | ................ | G02F 1/133516 |
| 2018/0053787 A1* | 2/2018 | Lim | ................ | G02F 1/1341 |

* cited by examiner

LIQUID CRYSTAL PANEL AND MANUFACTURING METHOD THEREOF

CROSS-REFERENCE TO RELATED APPLICATION

This application claims the priority benefit of Taiwan application serial no. 108132228, filed on Sep. 6, 2019. The entirety of the above-mentioned patent application is hereby incorporated by reference herein and made a part of this specification.

BACKGROUND OF THE INVENTION

Field of the Invention

The disclosure relates to a liquid crystal panel, and in particular, to a liquid crystal panel with a liquid crystal layer located in a cavity of an insulating layer and a manufacturing method thereof.

Description of Related Art

A liquid crystal display panel has advantages of a small size and low radiation, and has been widely used in a variety of electronic products. Currently, the liquid crystal display panel generally includes an upper substrate, a lower substrate, and a sealant used to connect the upper substrate and the lower substrate, where a liquid crystal is located between the upper substrate and the lower substrate, and the sealant surrounds the sealant. However, due to the arrangement of the sealant, the display panel has a very wide frame, which reduces a screen-to-body ratio of a product. With the progress of science and technology, consumers have higher and higher requirements on the appearance of display panels. To improve consumers' purchase intention, how to narrow the frame of the liquid crystal display panel has become one of problems to be resolved by manufacturers.

SUMMARY OF THE INVENTION

The invention provides a liquid crystal panel, which alleviates a problem of excessive width of a frame.

The invention provides a manufacturing method of a liquid crystal panel, which alleviates a problem of excessive width of a frame.

At least one embodiment of the invention provides a liquid crystal panel. The liquid crystal panel includes a substrate, an electrode layer, an insulating layer, a first alignment layer, a second alignment layer, and a liquid crystal layer. The electrode layer is located on the substrate. The insulating layer is located on the electrode layer. The insulating layer includes a cavity and at least one opening connected to a top portion of the cavity. The electrode layer is located below the cavity. A width of the opening is less than a width of the cavity. The first alignment layer is located in the cavity and located on the electrode layer. The second alignment layer is located at the top portion of the cavity. The liquid crystal layer is located in the cavity and between the first alignment layer and the second alignment layer.

At least one embodiment of the invention provides a manufacturing method of a liquid crystal panel, including: forming an electrode layer on a substrate; forming a sacrificial layer on the electrode layer; forming an insulating material layer to coat the sacrificial layer; patterning the insulating material layer to form an insulating layer having at least one opening, where the opening is located on the sacrificial layer; removing the sacrificial layer to form a cavity in the insulating layer, where the cavity is located on the electrode layer and a width of the at least one opening is less than a width of the cavity; filling a spontaneous alignment liquid crystal in the cavity; and aligning the spontaneous alignment liquid crystal to form a first alignment layer, a liquid crystal layer, and a second alignment layer that are located in the cavity, where the first alignment layer is located on the electrode layer, the second alignment layer is located at a top portion of the cavity, and the liquid crystal layer is located between the first alignment layer and the second alignment layer.

To make the foregoing features and advantages of the invention clearer and more comprehensible, embodiments are described in detail below with reference to the accompanying drawings.

DESCRIPTION OF THE EMBODIMENTS

FIG. 1A to FIG. 1K are each a schematic cross-sectional view of a manufacturing method of a liquid crystal panel according to an embodiment of the invention.

Figure 1A:
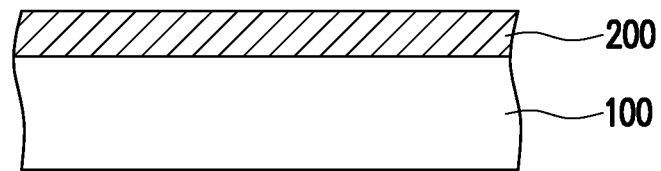
FIG. 1A to FIG. 1K are each a schematic cross-sectional view of a manufacturing method of a liquid crystal panel according to an embodiment of the invention.

Referring to FIG. 1A first, an electrode layer 200 is formed on a substrate 100. The substrate 100 is made of glass, quartz, organic polymer or other applicable materials. A thickness of the substrate 100 is, for example, hundreds of microns to several millimeters. For example, the thickness of the substrate 100 is 0.5 millimeters, but the invention is not limited thereto.

The electrode layer 200 is made of transparent conductive oxide. For example, the electrode layer 200 is made of indium tin oxide, indium zinc oxide, aluminum tin oxide, aluminum zinc oxide, indium gallium zinc oxide or a stack layer of at least two of the foregoing, but the invention is not limited thereto.

In some embodiments, other element layers are included between the electrode layer 200 and the substrate 100. Therefore, an electric field on the electrode layer 200 may be controlled by using a fringe field switching (FFS) technology or an in-plane switching (IPS) technology.

Figure 1B:
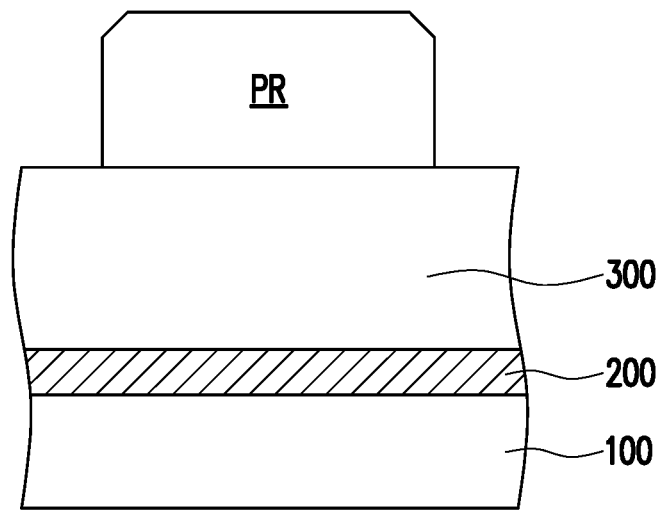
Figure 1C:
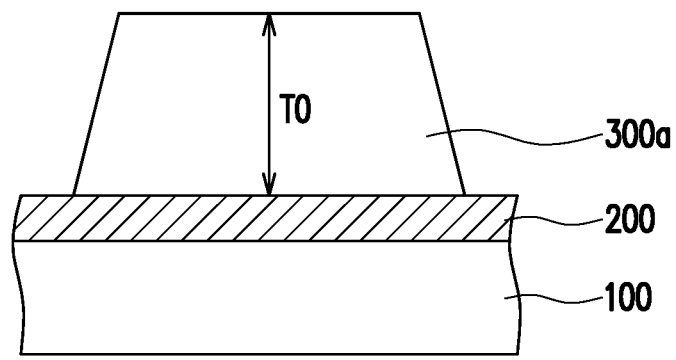

Referring to FIG. 1B and FIG. 1C, a sacrificial layer 300a is formed on the electrode layer 200. In the present embodiment, a method for forming the sacrificial layer 300a includes: forming a sacrificial material layer 300 on the electrode layer 200 first; and then etching the sacrificial material layer 300 by using a patterned photoresist PR as a mask to form the sacrificial layer 300a. In some embodiments, a thickness T0 of the sacrificial layer 300a is 2 microns to 3 microns, and a thickness of a liquid crystal layer formed subsequently is controlled by adjusting the thickness T0 of the sacrificial layer 300a. In some embodiments, the sacrificial layer 300a is made of silicon oxide or other similar materials. The photoresist PR is removed after the sacrificial layer 300a is formed. For example, the sacrificial layer 300a is of an island structure.

Figure 1D:
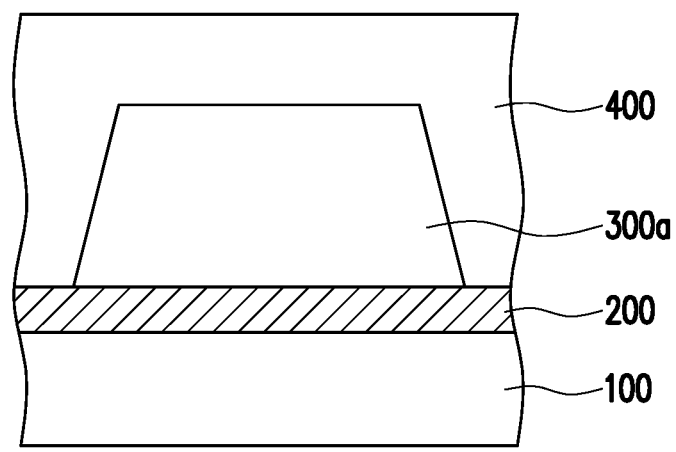

Referring to FIG. 1D, an insulating material layer 400 is formed to coat the sacrificial layer 300a. In some embodiments, the insulating material layer 400 includes photoresists and other organic materials.

Figure 1E:
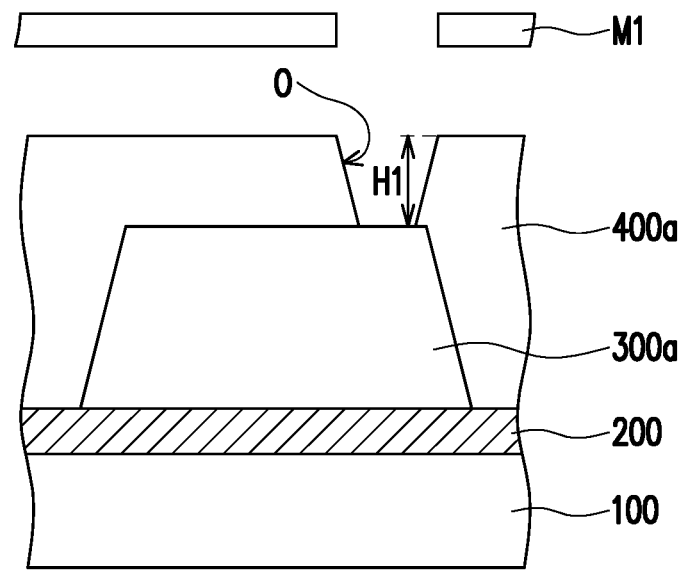
Figure 1F:
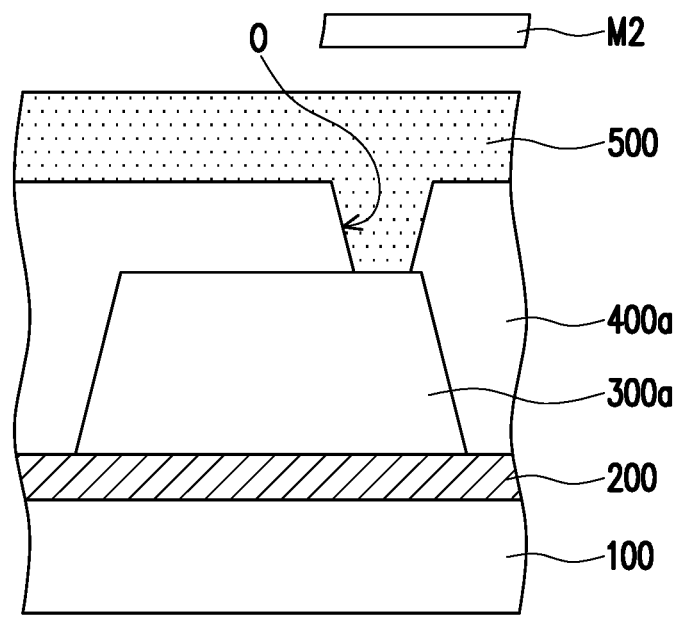

Referring to FIG. 1E, a first mask M1 is used as the mask to pattern the insulating material layer 400 to form an insulating layer 400a having at least one opening O. The opening O is located on the sacrificial layer 300a, and the opening O exposes an upper surface of the sacrificial layer 300a. In the present embodiment, the insulating layer 400a includes a solidified photoresist, and the insulating layer 400a is made of transparent material. For example, the penetrability of the insulating layer 400a is 90% to 95%, but the invention is not limited thereto. In some embodiments, the insulating layer 400a is heated to be firmer. In some embodiments, a height H1 of the opening O is 2 microns to 3 microns.

Figure 1G:
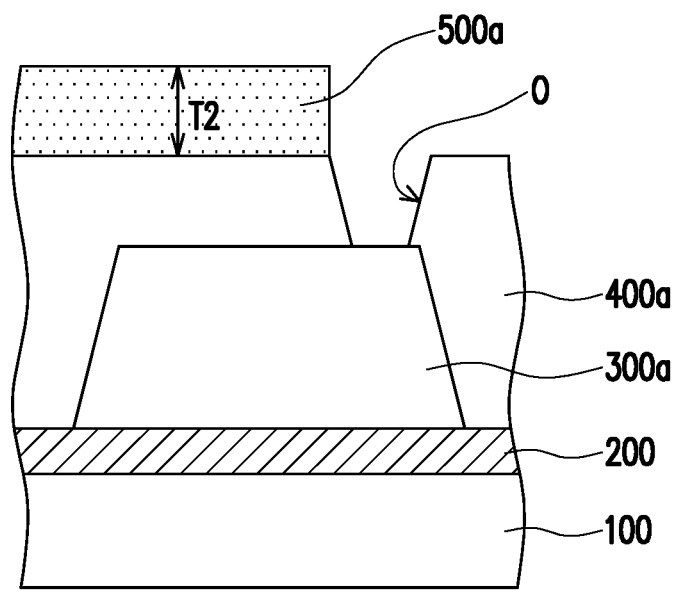

Referring to FIG. IF and FIG. 1G, a color filter pattern 500a is formed on the insulating layer 400a.

In the present embodiment, a filter material layer 500 is formed on the insulating layer 400a, and part of the filter material layer 500 is filled into the opening O of the insulating layer 400a and is in contact with the sacrificial layer 300a. A second mask M2 is used to the mask, and the color filter pattern 500a is defined. The color filter pattern 500a is located on the insulating layer 400a, and the color filter pattern 500a does not overlap the opening O. In other words, the filter material layer 500 is patterned to form the color filter pattern 500a exposing the opening O. A thickness T2 of the color filter pattern 500a is, for example, 1 micron to 1.5 microns.

In some embodiments, the color filter pattern 500a is heated to be firmer.

Figure 1H:
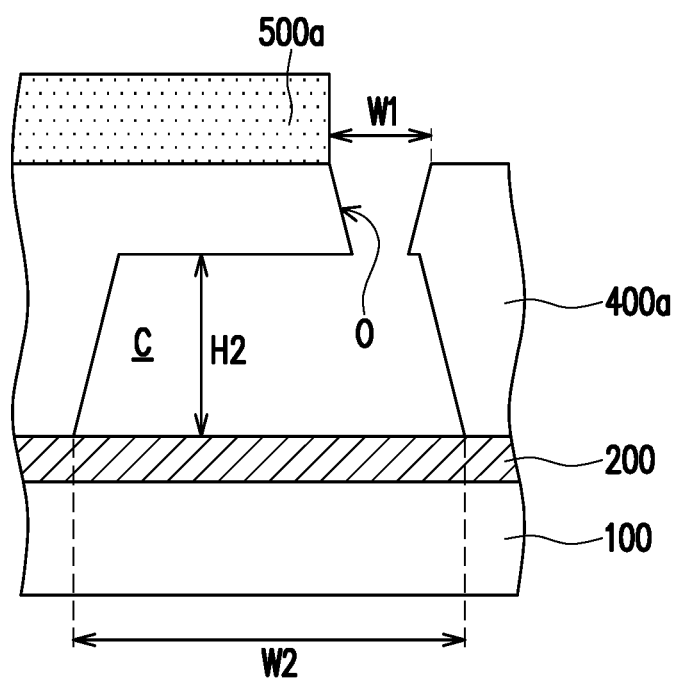

Referring to FIG. 1H, the sacrificial layer 300a is removed to form a cavity C in the insulating layer 400a, where the cavity C is located on the electrode layer 200. In the present embodiment, the sacrificial layer 300a is removed by using an isotropic etching technology. For example, the sacrificial layer 300a is removed by using a buffered oxide etch (BOE) liquid, a hydrogen fluoride (HF) or other wet etching manners.

In the present embodiment, a width W1 of the opening O is less than a width W2 of the cavity C. In the present embodiment, the opening O decreases in width as it approaches the substrate 100, and the cavity C increases in width as it approaches the substrate 100, but the invention is not limited thereto.

In some embodiments, a height H2 of the cavity C is 2 microns to 3 microns.

Figure 1I:
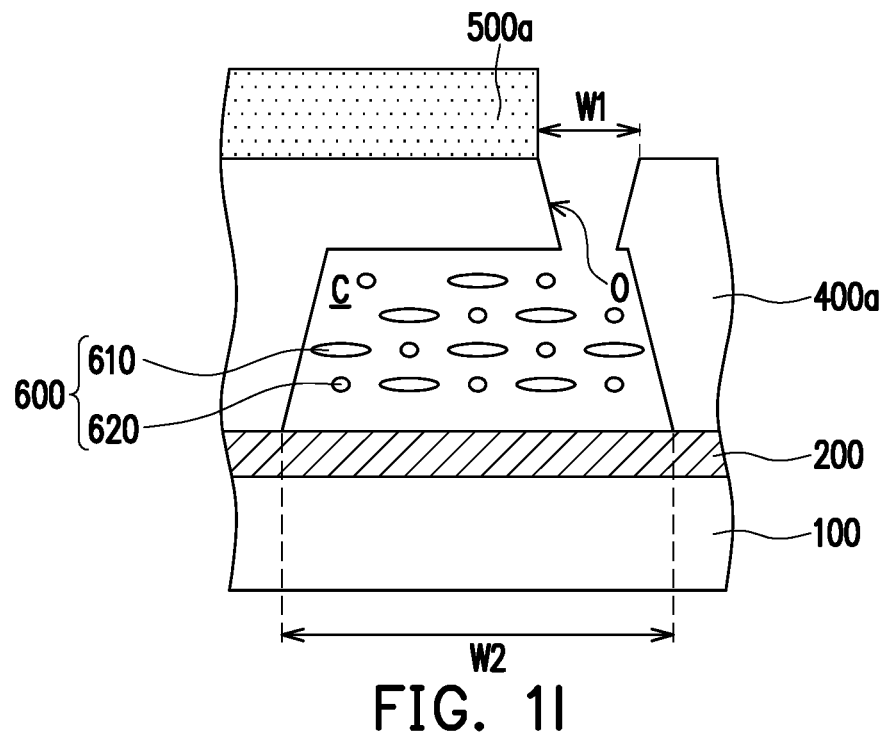

Referring to FIG. 1I, a spontaneous alignment liquid crystal 600 is filled into the cavity C. For example, the spontaneous alignment liquid crystal 600 is dripped into the cavity C through the opening O by means of a liquid crystal injection process (for example, a one drop filling (ODF) process). The spontaneous alignment liquid crystal 600 includes a plurality of molecules 610 and a plurality of liquid crystal molecules 620. In some embodiments, the spontaneous alignment liquid crystal 600 further includes other solvents and additives.

Figure 1J:
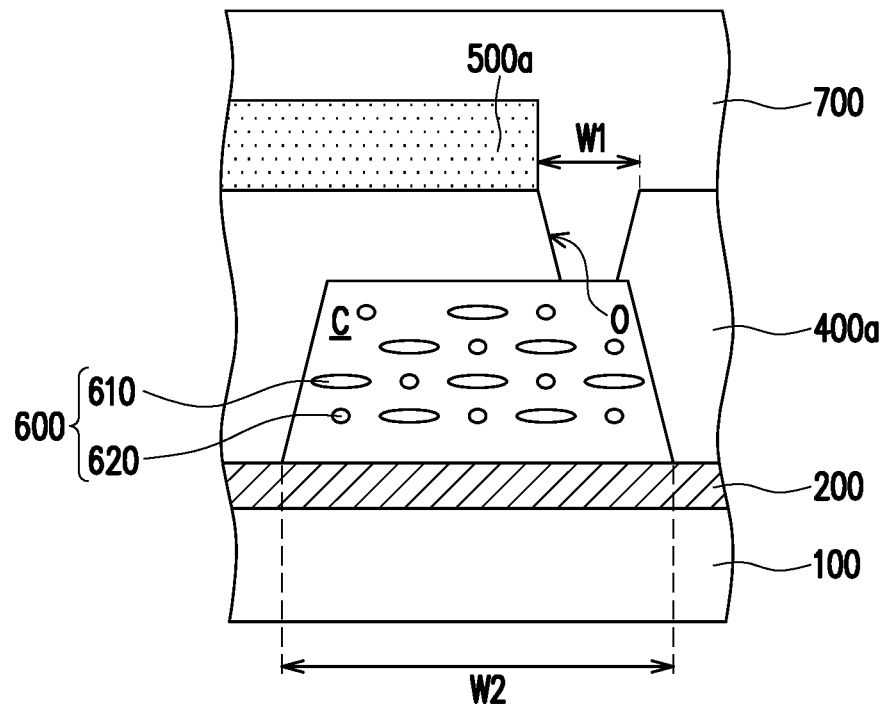

Referring to FIG. 1J, a cover layer 700 is coated on the color filter pattern 500a and a surface of the insulating layer 400a, and part of the cover layer 700 is filled into the opening O to close the opening O. In the present embodiment, the cover layer 700 is a fully covered insulating layer that is made of transparent material. For example, the penetrability of the cover layer 700 is 90% to 95%, but the invention is not limited thereto. In the present embodiment, the cover layer 700 is not patterned. In some embodiments, the cover layer 700 is heated to be firmer. In some embodiments, a thickness of the cover layer 700 is 1 micron to 1.5 microns.

Figure 1K:
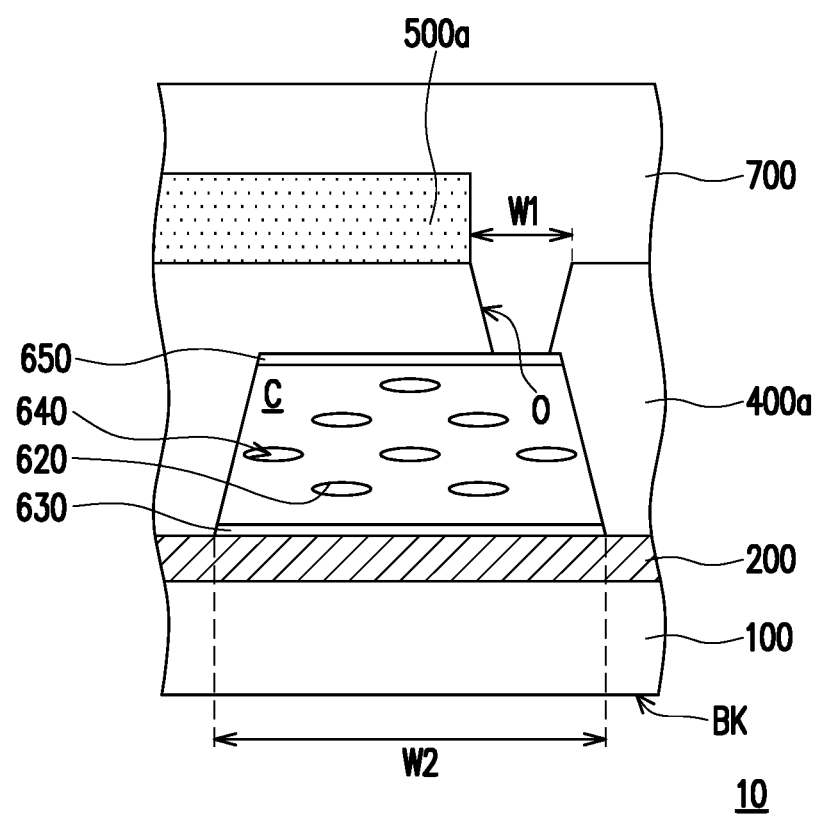

Referring to FIG. 1K, the spontaneous alignment liquid crystal 600 is aligned to form a first alignment layer 630, a liquid crystal layer 640, and a second alignment layer 650 that are located in the cavity C. In the present embodiment, the spontaneous alignment liquid crystal 600 is photo-aligned. For example, an ultraviolet light from a back BK of the substrate 100 is irradiated on the spontaneous alignment liquid crystal 600 to form the first alignment layer 630, the liquid crystal layer 640, and the second alignment layer 650.

The first alignment layer 630 is located on the electrode layer 200, and the first alignment layer 630 is located at a bottom portion of the cavity C. The second alignment layer 650 is located at a top portion of the cavity. The liquid crystal layer 640 is located between the first alignment layer 630 and the second alignment layer 650. In the present embodiment, the liquid crystal layer 640 includes liquid crystal molecules 620, and the molecules 610 are dissociated/polymerized into the first alignment layer 630 and the second alignment layer 650 after exposure to the ultraviolet light.

In this way, a liquid crystal panel 10 is roughly completed. The liquid crystal panel 10 includes the substrate 100, the electrode layer 200, the insulating layer 400a, the first alignment layer 630, the second alignment layer 650, and the liquid crystal layer 640. The electrode layer 200 is located on the substrate 100. The insulating layer 400a is located on the electrode layer 200. The insulating layer 400a includes a cavity C and at least one opening O connected to a top portion of the cavity C. The electrode layer 200 is located below the cavity C. The width W1 of the opening O is less than the width W2 of the cavity C. The first alignment layer 630 is located in the cavity C and located on the electrode layer 200. The second alignment layer 650 is located at the top portion of the cavity C. The liquid crystal layer 640 is located in the cavity C and between the first alignment layer 630 and the second alignment layer 650.

Based on the foregoing, the liquid crystal layer 640 of the liquid crystal panel 10 in the present embodiment is located in the cavity C of the insulating layer 400a, therefore, there is no need to reserve a width for a sealant in a frame area, and the liquid crystal panel 10 has an advantage of narrow frame or even no frame.

Figure 2A:
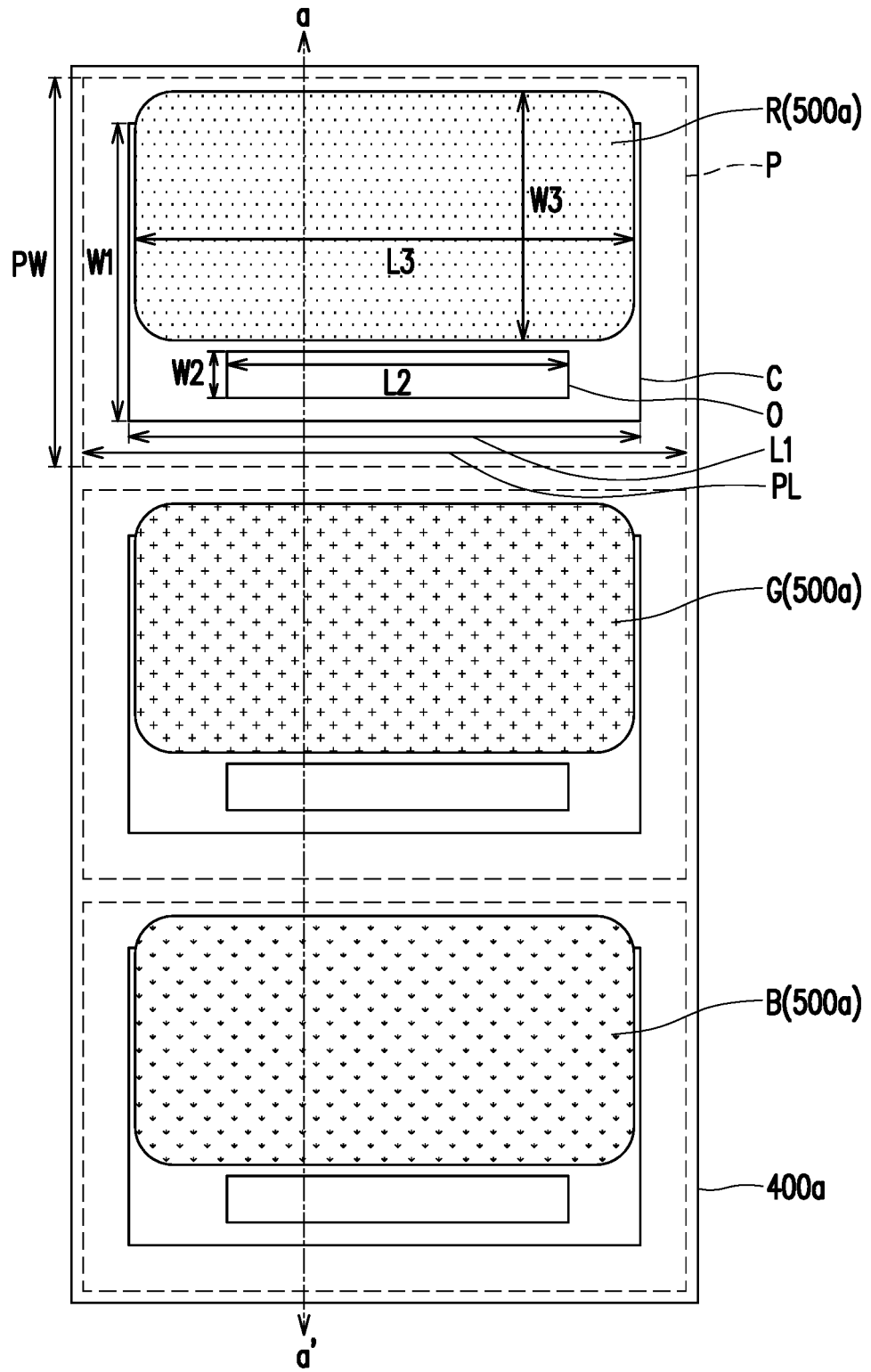
FIG. 2A is a schematic top view of a liquid crystal panel according to an embodiment of the invention.
Figure 2B:
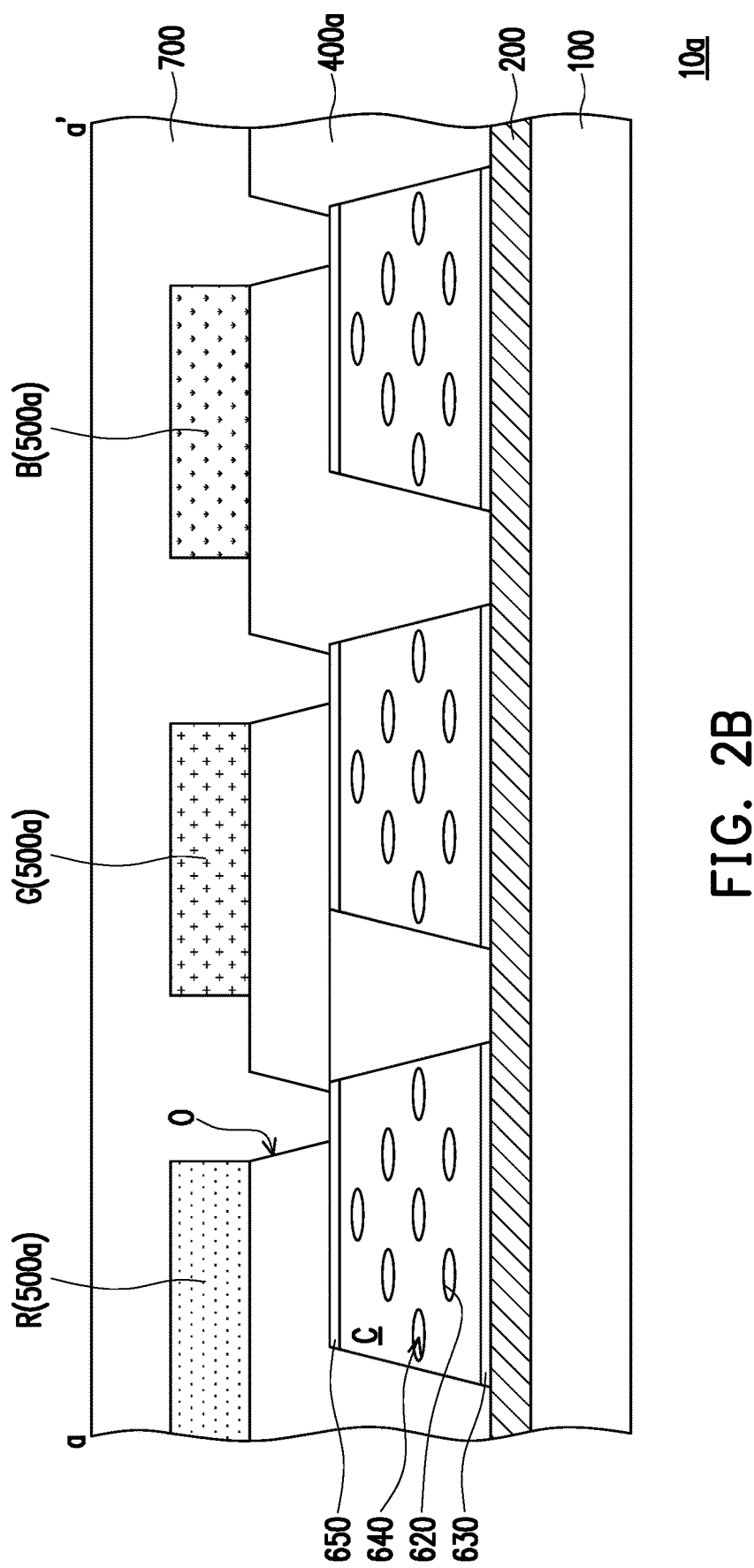
FIG. 2B is a schematic cross-sectional view along FIG. 2A.

FIG. 2A is a schematic top view of a liquid crystal panel according to an embodiment of the invention. FIG. 2B is a schematic cross-sectional view along FIG. 2A.

It must be noted herein that embodiments of FIG. 2A and FIG. 2B follow the element labels and partial content of the embodiments of FIG. 1A to FIG. 1J, where same or similar labels are used to represent same or similar elements, and descriptions of the same technical content are omitted. For the descriptions of the omitted part, refer to the foregoing embodiment, and the descriptions thereof are omitted herein.

Referring to FIG. 2A and FIG. 2B, in the present embodiment, the insulating layer 400a of the liquid crystal panel 10 includes a plurality of cavities C and a plurality of openings O, and each cavity C is disposed corresponding to one sub-pixel P.

In the present embodiment, a width PW of the sub-pixel P is 25 microns to 40 microns, and a length PL of the sub-pixel P is 30 microns to 60 microns. The width W1 of the cavity C is 15 microns to 30 microns, and a length L1 of the cavity C is 20 microns to 50 microns. The width W2 of the opening O is 3 microns to 5 microns, and a length L2 of the opening O is 15 microns to 30 microns. In the present embodiment, each cavity C is connected to one corresponding opening O, and the opening O is of an elongated shape, so that an etching rate can be accelerated and the process time can be shortened, but the invention is not limited thereto. A quantity and shapes of the openings O connected to each cavity C may be adjusted according to actual requirements. For example, each cavity C is connected to a plurality of openings O, and the openings O are of round, square, or other geometrical shapes.

In the present embodiment, a color of the color filter pattern 500a on the sub-pixel P is adjustable according to actual requirements. For example, the color filter pattern 500a of FIG. 2B includes a red filter pattern R, a green filter pattern G, and a blue filter pattern B, and the red filter pattern R, the green filter pattern G, and the blue filter pattern B are disposed on corresponding sub-pixels P respectively. The red filter pattern R, the green filter pattern G, and the blue filter pattern B each have a width W3 of 10 microns to 20 microns, and the red filter pattern R, the green filter pattern G, and the blue filter pattern B each have a length L3 of 20 microns to 40 microns.

Figure 3:
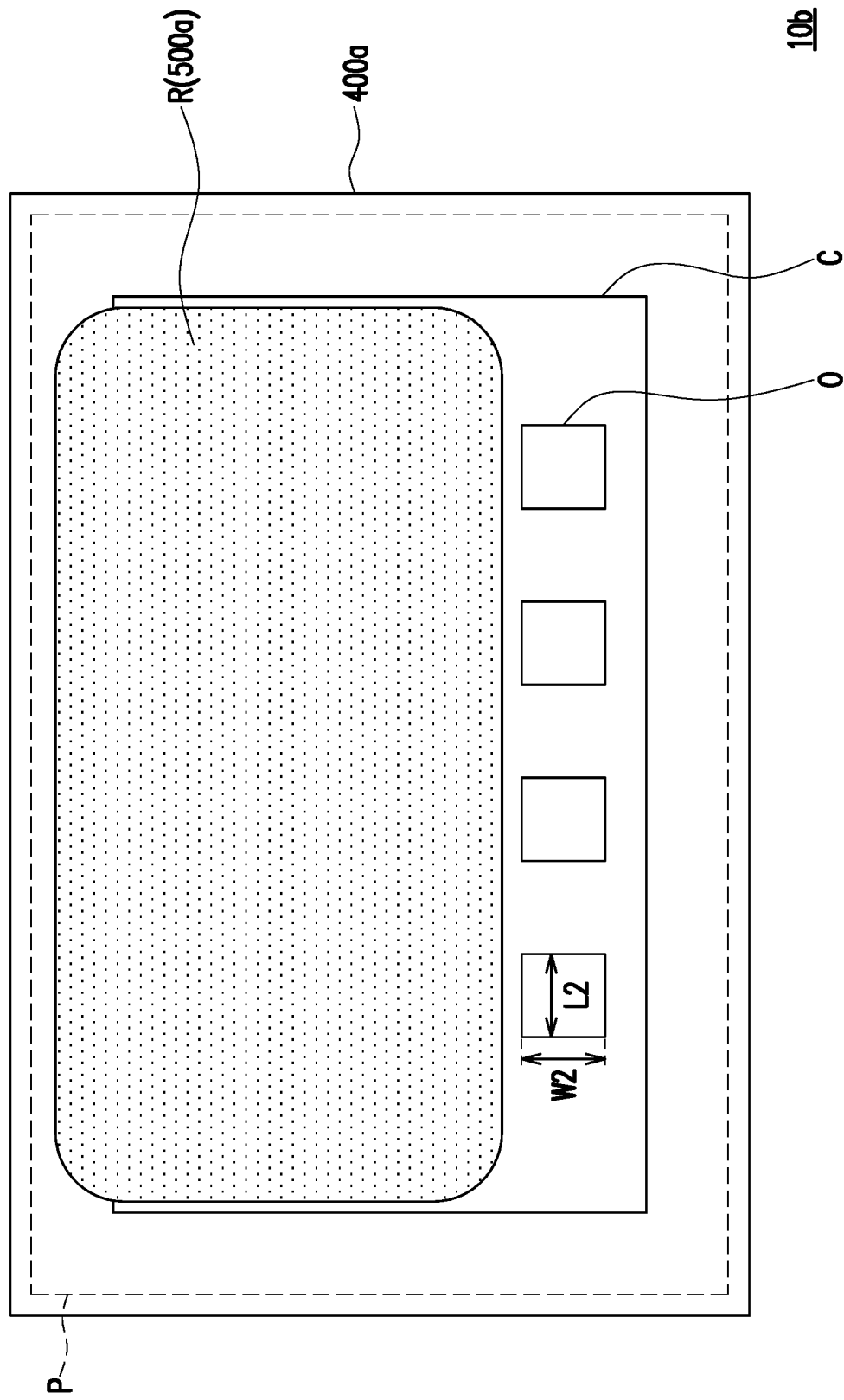
FIG. 3 is a schematic top view of a liquid crystal panel according to an embodiment of the invention.

FIG. 3 is a schematic top view of a liquid crystal panel according to an embodiment of the invention.

It must be noted herein that embodiments of FIG. 3 follow the element labels and partial content of the embodiments of FIG. 2A and FIG. 2B, where same or similar labels are used to represent same or similar elements, and descriptions of the same technical content are omitted. For the descriptions of the omitted part, refer to the foregoing embodiment, and the descriptions thereof are omitted herein.

Referring to FIG. 3, each cavity in a liquid crystal panel 10b is connected to a plurality of corresponding openings O. In the present embodiment, the width W2 of the opening O is 3 microns to 5 microns, and the length L2 of the opening O is 3 microns to 5 microns.

The liquid crystal layer is less likely to be contaminated when the area of a single opening O is reduced.

Figure 4:
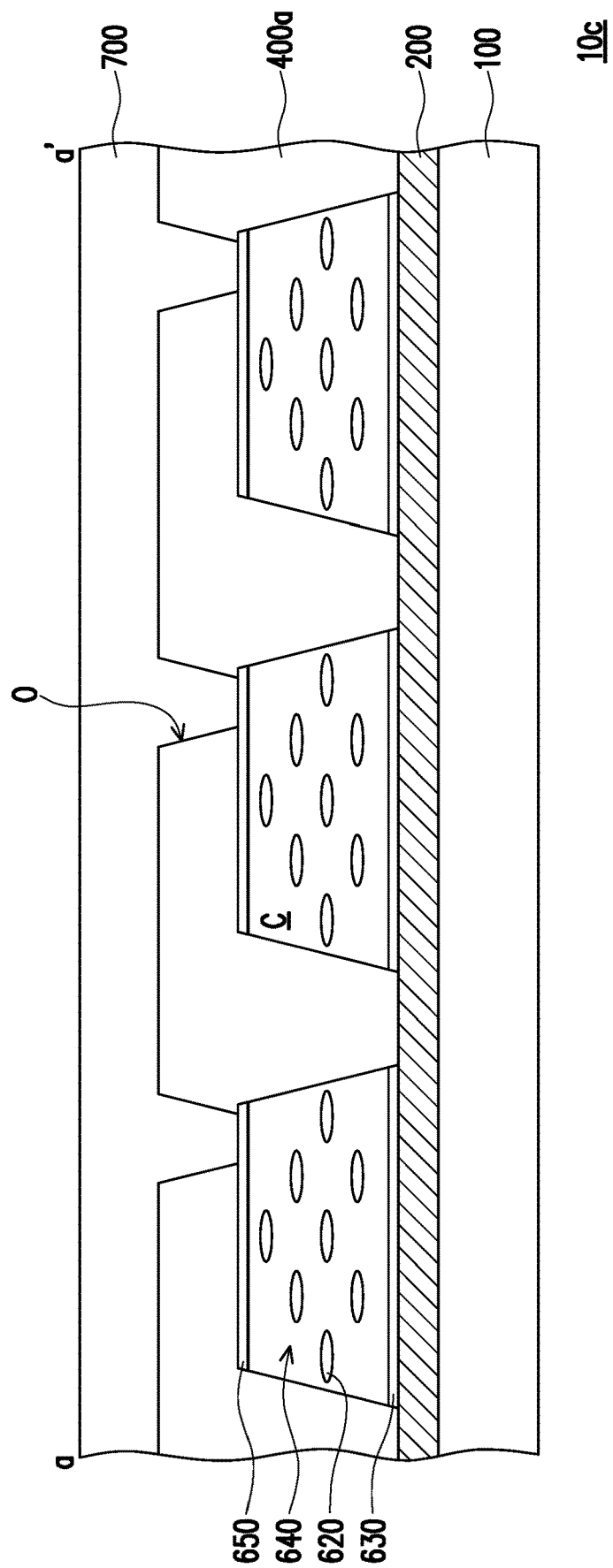
FIG. 4 is a schematic cross-sectional view of a liquid crystal panel according to an embodiment of the invention.

FIG. 4 is a schematic cross-sectional view of a liquid crystal panel according to an embodiment of the invention.

It must be noted herein that embodiments of FIG. 4 follow the element labels and partial content of the embodiments of FIG. 2A and FIG. 2B, where same or similar labels are used to represent same or similar elements, and descriptions of the same technical content are omitted. For the descriptions of the omitted part, refer to the foregoing embodiment, and the descriptions thereof are omitted herein.

Referring to FIG. 4, in the present embodiment, a liquid crystal panel 10c does not include the color filter pattern 500a, in other words, the liquid crystal panel 10c is applicable to a grayscale display.

FIG. 5A to FIG. 5D are each a cross-sectional view of a manufacturing method of a liquid crystal panel according to an embodiment of the invention.

It must be noted herein that embodiments of FIG. 5A to FIG. 5D follow the element labels and partial content of the embodiments of FIG. 1A and FIG. 1E, where same or similar labels are used to represent same or similar elements, and descriptions of the same technical content are omitted. For the descriptions of the omitted part, refer to the foregoing embodiment, and the descriptions thereof are omitted herein.

Figure 5A:
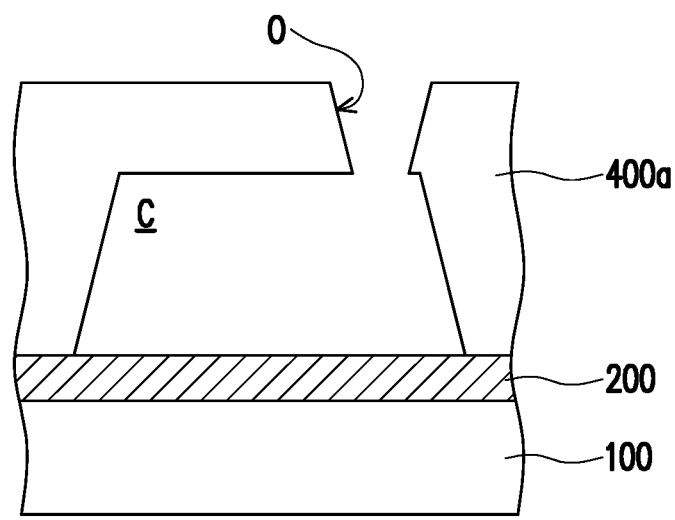
FIG. 5A to FIG. 5D are each a cross-sectional view of a manufacturing method of a liquid crystal panel according to an embodiment of the invention.

Referring to FIG. 5A, in the present embodiment, the sacrificial layer 300a is removed after the insulating layer 400a (as shown in FIG. 1E) having at least one opening O is formed. In the present embodiment, the sacrificial layer 300a is removed by using an isotropic etching technology. For example, the sacrificial layer 300a is removed by using a BOE liquid, an HF or other wet etching manners.

Figure 5B:
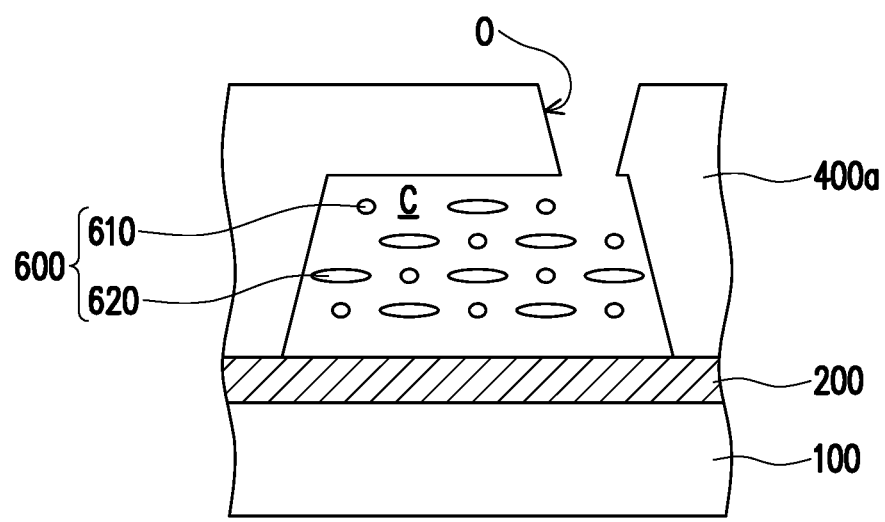

Referring to FIG. 5B, the spontaneous alignment liquid crystal 600 is filled into the cavity C. For example, the spontaneous alignment liquid crystal 600 is dripped into the cavity C through the opening O by means of a liquid crystal injection process (for example, an ODF process). The spontaneous alignment liquid crystal 600 includes a plurality of molecules 610 and a plurality of liquid crystal molecules 620. In some embodiments, the spontaneous alignment liquid crystal 600 further includes other solvents and additives.

Figure 5C:
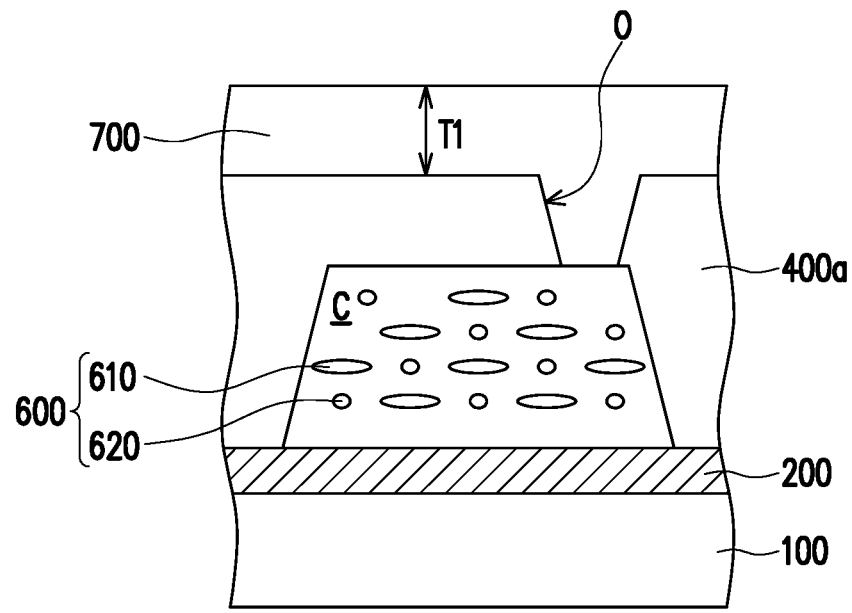

Referring to FIG. 5C, the cover layer 700 is formed on the insulating layer 400a after the spontaneous alignment liquid crystal 600 is filled into the cavity C. Part of the cover layer 700 is filled into the opening O. In the present embodiment, the cover layer 700 is filled into the opening O, rather than the cavity C.

In the present embodiment, a method for forming the cover layer 700 on the insulating layer 400a includes: for example, forming a covering material layer on the insulating layer 400a first, and then solidifying the covering material layer to form the cover layer 700. In some embodiments, the cover layer 700 and the insulating layer 400a are made of a same solidified photoresist material, and a thickness T1 of the cover layer 700 is 1 micron to 1.5 microns, but the invention is not limited thereto. In another embodiment, for example, the cover layer 700 is made of polyimide, and the thickness T1 of the cover layer 700 is 5 microns to 10 microns.

Figure 5D:
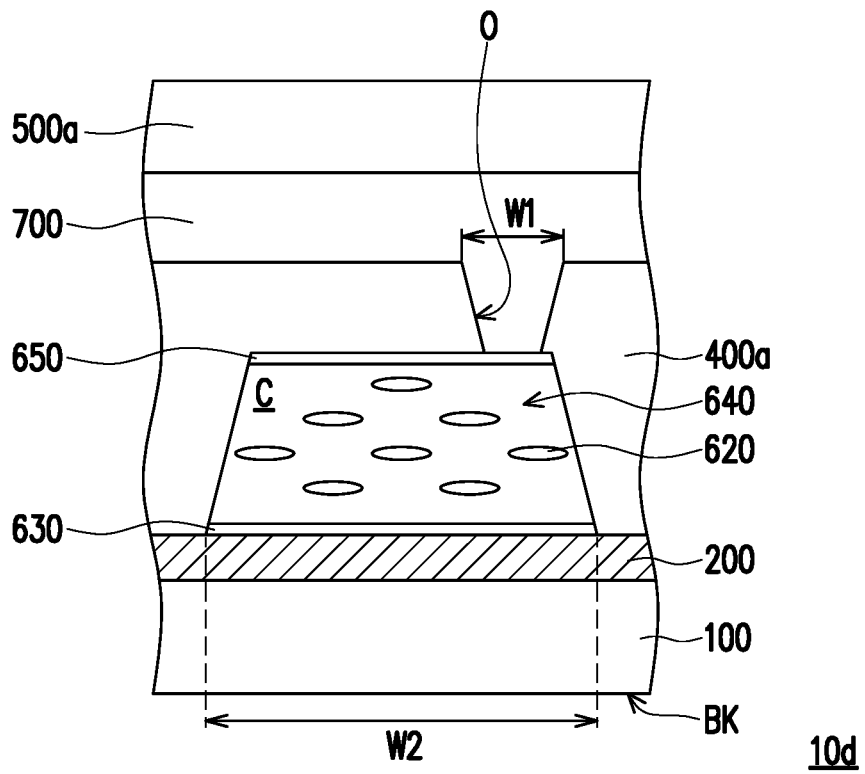

Referring to FIG. 5D, the spontaneous alignment liquid crystal 600 is aligned to form a first alignment layer 630, a liquid crystal layer 640, and a second alignment layer 650 that are located in the cavity C. In the present embodiment, the spontaneous alignment liquid crystal 600 is photo-aligned. For example, an ultraviolet light from a back BK of the substrate 100 is irradiated on the spontaneous alignment liquid crystal 600 to form the first alignment layer 630, the liquid crystal layer 640, and the second alignment layer 650.

The first alignment layer 630 is located on the electrode layer 200, and the first alignment layer 630 is located at a bottom portion of the cavity C. The second alignment layer 650 is located at a top portion of the cavity C. In the present embodiment, the second alignment layer 650 is in contact with the insulating layer 400a and the cover layer 700. The liquid crystal layer 640 is located between the first alignment layer 630 and the second alignment layer 650. In the present embodiment, the liquid crystal layer 640 includes liquid crystal molecules 620, and the molecules 610 are dissociated/polymerized into the first alignment layer 630 and the second alignment layer 650 after exposure to the ultraviolet light.

Referring to FIG. 5D, the color filter pattern 500a is formed on the cover layer 700, and the color filter pattern 500a overlaps the opening O.

In this way, a liquid crystal panel 10d is roughly completed. The liquid crystal panel 10d includes a substrate 100, an electrode layer 200, an insulating layer 400a, a first alignment layer 630, a second alignment layer 650, and a liquid crystal layer 640. The electrode layer 200 is located on the substrate 100. The insulating layer 400a is located on the electrode layer 200. The insulating layer 400a includes a cavity C and at least one opening O connected to a top portion of the cavity C. The electrode layer 200 is located below the cavity C. A width W1 of the opening O is less than a width W2 of the cavity C. The first alignment layer 630 is located in the cavity C and located on the electrode layer 200. The second alignment layer 650 is located at the top portion of the cavity. The liquid crystal layer 640 is located in the cavity C and between the first alignment layer 630 and the second alignment layer 650.

Figure 6:
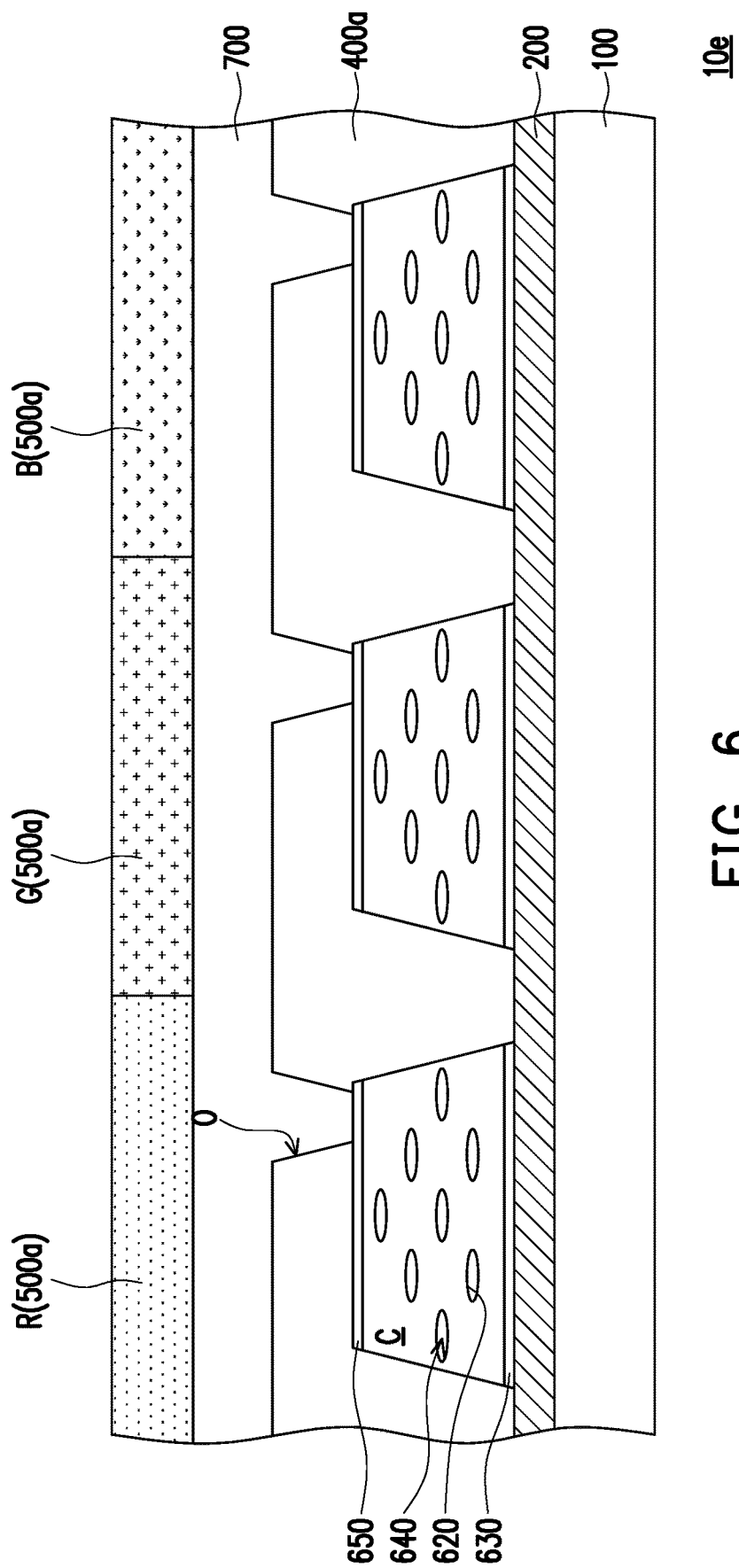
FIG. 6 is a schematic cross-sectional view of a liquid crystal panel according to an embodiment of the invention.

FIG. 6 is a schematic cross-sectional view of a liquid crystal panel according to an embodiment of the invention.

It must be noted herein that embodiments of FIG. 6 follow the element labels and partial content of the embodiments of FIG. 5A to FIG. 5D, where same or similar labels are used to represent same or similar elements, and descriptions of the same technical content are omitted. For the descriptions of the omitted part, refer to the foregoing embodiment, and the descriptions thereof are omitted herein.

Referring to FIG. 6, in the present embodiment, the insulating layer 400a of a liquid crystal panel 10e includes a plurality of cavities C and a plurality of openings O. The cover layer 700 is filled into the opening O, and the color filter pattern 500a is formed on the cover layer 700. Therefore, the color filter pattern 500a is provided with a relatively large disposition area.

Figure 7:
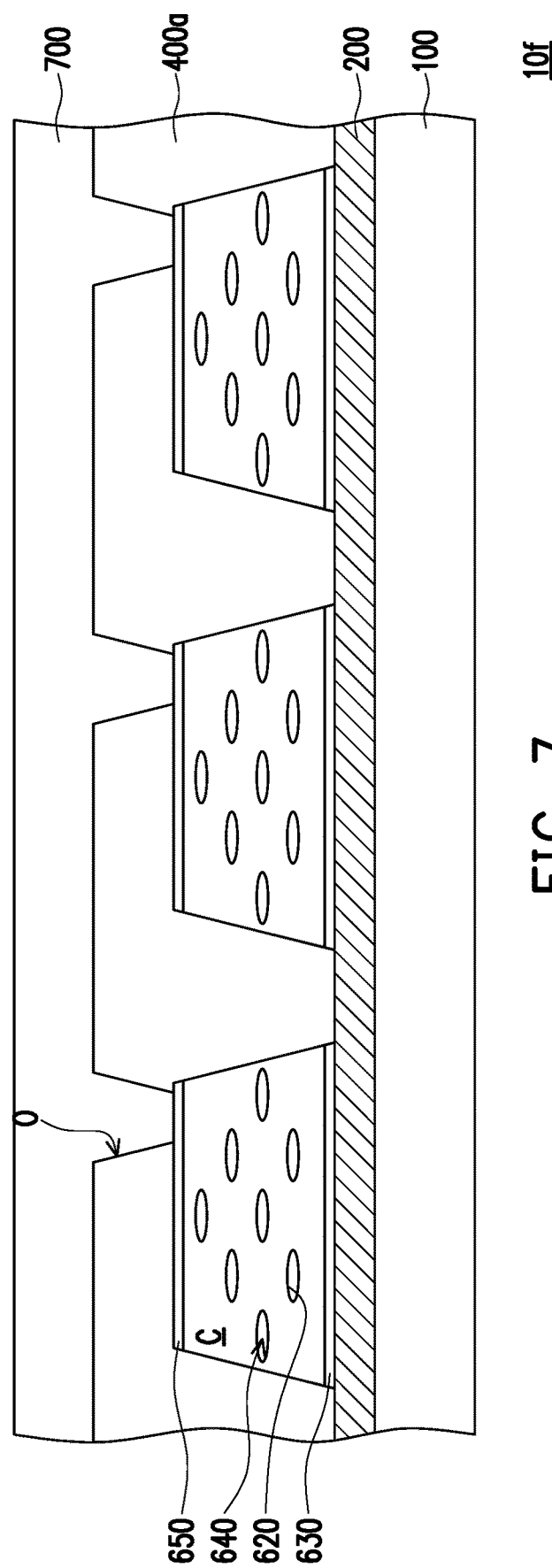
FIG. 7 is a schematic cross-sectional view of a liquid crystal panel according to an embodiment of the invention.

FIG. 7 is a schematic cross-sectional view of a liquid crystal panel according to an embodiment of the invention.

It must be noted herein that embodiments of FIG. 7 follow the element labels and partial content of the embodiments of FIG. 6, where same or similar labels are used to represent same or similar elements, and descriptions of the same technical content is omitted. For the descriptions of the omitted part, refer to the foregoing embodiment, and the descriptions thereof are omitted herein.

Referring to FIG. 7, in the present embodiment, a liquid crystal panel 10f does not include the color filter pattern 500a, in other words, the liquid crystal panel 10c is applicable to a grayscale display.

Based on the foregoing, the liquid crystal layer of the liquid crystal panel in the embodiments of the invention is located in the cavity of the insulating layer, therefore, there is no need to reserve a width for a sealant in a frame area, and the liquid crystal panel has an advantage of narrow frame or even no frame.

Although the invention has been disclosed above in the embodiments, the embodiments are not intended to limit the invention. Any person of ordinary skill in the art can make some changes and embellishment without departing from the spirit and scope of the invention. Therefore, the protection scope of the invention shall be subject to the scope of the appended claims.

What is claimed is:

1. A liquid crystal panel, comprising:
   a substrate;
   an electrode layer, located on the substrate;
   an insulating layer, located on the electrode layer, wherein the insulating layer comprises a cavity and at least one opening connected to a top portion of the cavity, the electrode layer is located below the cavity, and a width of the at least one opening is less than a width of the cavity;
   a first alignment layer, located in the cavity and located on the electrode layer;
   a second alignment layer, located at the top portion of the cavity; and
   a liquid crystal layer, located in the cavity and between the first alignment layer and the second alignment layer;
   a cover layer, located on the insulating layer, wherein a part of the cover layer is filled into the opening, wherein the second alignment layer is in contact with the insulating layer and the cover layer, a bottom surface of the part of the cover layer is in contact with the second alignment layer, and a side surface of the part of the cover layer is surrounded by the insulating layer; and
   a color filter pattern, located on the cover layer, wherein the color filter pattern overlaps the at least one opening.

2. The liquid crystal panel according to claim 1, wherein the opening decreases in width as it approaches the substrate, and the cavity increases in width as it approaches the substrate.

3. The liquid crystal panel according to claim 1, wherein the cavity is connected to a plurality of corresponding openings.

4. The liquid crystal panel according to claim 1, wherein a material of the insulating layer comprises a solidified photoresist.

5. The liquid crystal panel according to claim 1, wherein a material of the cover layer comprises a solidified photoresist or polyimide.

6. A liquid crystal panel, comprising:
   a substrate;
   an electrode layer, located on the substrate;
   an insulating layer, located on the electrode layer, wherein the insulating layer comprises a cavity and at least one opening connected to a top portion of the cavity, the electrode layer is located below the cavity, and a width of the at least one opening is less than a width of the cavity;
   a first alignment layer, located in the cavity and located on the electrode layer;
   a second alignment layer, located at the top portion of the cavity; and
   a liquid crystal layer, located in the cavity and between the first alignment layer and the second alignment layer;
   a cover layer, located on the insulating layer, wherein a part of the cover layer is filled into the opening, wherein the second alignment layer is in contact with the insulating layer and the cover layer, a bottom surface of the part of the cover layer is in contact with the second alignment layer, and a side surface of the part of the cover layer is surrounded by the insulating layer; and
   a color filter pattern, located on the insulating layer, wherein the color filter pattern does not overlap the at least one opening.

7. A manufacturing method of a liquid crystal panel, comprising:
   forming an electrode layer on a substrate;
   forming a sacrificial layer on the electrode layer;
   forming an insulating material layer to coat the sacrificial layer;
   patterning the insulating material layer to form an insulating layer having at least one opening, wherein the at least one opening is located on the sacrificial layer;

removing the sacrificial layer to form a cavity in the insulating layer, wherein the cavity is located on the electrode layer and a width of the at least one opening is less than a width of the cavity;

filling a spontaneous alignment liquid crystal into the cavity;

forming a cover layer on the insulating layer after the spontaneous alignment liquid crystal is filled into the cavity, wherein a part of the cover layer is filled into the opening;

after forming the cover layer on the insulating layer, aligning the spontaneous alignment liquid crystal to form a first alignment layer, a liquid crystal layer, and a second alignment layer that are located in the cavity, wherein the first alignment layer is located on the electrode layer, the second alignment layer is located at a top portion of the cavity, and the liquid crystal layer is located between the first alignment layer and the second alignment layer; and forming a color filter pattern on the cover layer, wherein the color filter pattern overlaps the at least one opening.

\* \* \* \* \*